United States Patent
Criel et al.

(10) Patent No.: US 12,158,241 B2
(45) Date of Patent: Dec. 3, 2024

(54) PRESSURIZED FLUID STORAGE AND DISPENSING ASSEMBLY FOR A VEHICLE

(71) Applicant: Plastic Omnium New Energies France, Lyons (FR)

(72) Inventors: Bjorn Criel, Brussels (BE); Michael Gras, Brussels (BE)

(73) Assignee: Plastic Omnium New Energies France, Lyons (FR)

(*) Notice: Subject to any disclaimer, the term of this patent is extended or adjusted under 35 U.S.C. 154(b) by 215 days.

(21) Appl. No.: 17/781,678

(22) PCT Filed: Dec. 1, 2020

(86) PCT No.: PCT/EP2020/084172
§ 371 (c)(1),
(2) Date: Jun. 1, 2022

(87) PCT Pub. No.: WO2021/110707
PCT Pub. Date: Jun. 10, 2021

(65) Prior Publication Data
US 2023/0058291 A1 Feb. 23, 2023

(30) Foreign Application Priority Data

Dec. 2, 2019 (FR) ........................................ 1913611
Sep. 30, 2020 (FR) ........................................ 2009993

(51) Int. Cl.
*F17C 13/08* (2006.01)
*F17C 13/04* (2006.01)

(52) U.S. Cl.
CPC ............ *F17C 13/084* (2013.01); *F17C 13/04* (2013.01); *F17C 2201/0104* (2013.01);
(Continued)

(58) Field of Classification Search
CPC ...... F17C 2203/0604; F17C 2201/0166; F17C 2201/0104; F17C 2205/0326; F17C 13/04; F17C 13/084; Y10T 137/86187
See application file for complete search history.

(56) References Cited

U.S. PATENT DOCUMENTS 3,319,433 A * 5/1967 Pauliukonis ............... F17C 3/08
220/564
5,454,408 A * 10/1995 DiBella .................. F04B 9/1176
141/47
(Continued)

FOREIGN PATENT DOCUMENTS

DE  10 2010 045 705 A1  7/2011
DE  10 2015 015 004 A1  5/2017
(Continued)

OTHER PUBLICATIONS

International Search Report mailed on Apr. 29, 2021 in PCT/EP2020/084172 filed on Dec. 1, 2020 (citing references AA-AH and AP-AW therein, 5 pages).
(Continued)

*Primary Examiner* — Jessica Cahill
(74) *Attorney, Agent, or Firm* — Oblon, McClelland, Maier & Neustadt, L.L.P.

(57) ABSTRACT

The invention relates to a pressurized fluid storage and dispensing assembly (1) for a vehicle, comprising:
a plurality of pressurized fluid reservoirs (3), each reservoir (3) comprising a first end piece (13) provided with at least one fluid passage duct configured for dispensing fluid from the reservoir (3) and for filling the reservoir (3),
a use collector duct (5) which comprises an opening (19) for supplying and/or dispensing fluid and a plurality of orifices, each orifice being configured to be fluidically connected to a reservoir (3) via its fluid passage duct, and (Continued)

an electrically operated valve (7) which is arranged at one end of the use collector duct (5) and selectively closes or opens the fluid passage through the opening (19).
The invention also relates to a vehicle comprising such a storage and dispensing assembly (1).

16 Claims, 5 Drawing Sheets

(52) U.S. Cl.
CPC .............. *F17C 2201/0166* (2013.01); *F17C 2203/0604* (2013.01); *F17C 2205/0326* (2013.01)

(56) References Cited

U.S. PATENT DOCUMENTS

| | | | |
|---|---|---|---|
| 6,240,909 | B1 | 6/2001 | Scott |
| 6,257,360 | B1 | 7/2001 | Wozniak et al. |
| 6,321,775 | B1 | 11/2001 | Hildebrand et al. |
| 6,393,846 | B1 | 5/2002 | Frye |
| 6,418,962 | B1 | 7/2002 | Wozniak et al. |
| 8,899,279 | B2 * | 12/2014 | Safronovs ............. F04B 35/008 141/26 |
| 2003/0146214 | A1 | 8/2003 | Idoguchi |
| 2004/0159352 | A1 | 8/2004 | Friedlmeier et al. |
| 2009/0283351 | A1 | 11/2009 | Cannet et al. |
| 2010/0206402 | A1 * | 8/2010 | Uchimura ............... F17C 13/04 137/511 |
| 2013/0269814 | A1 * | 10/2013 | Mayr ....................... F17C 5/00 138/30 |
| 2018/0119882 | A1 * | 5/2018 | Allidieres ............. F17C 13/025 |
| 2019/0047404 | A1 | 2/2019 | Sawai |
| 2019/0047407 | A1 | 2/2019 | Kataoka et al. |
| 2020/0224825 | A1 * | 7/2020 | Winand ................ F17C 13/084 |
| 2021/0146774 | A1 | 5/2021 | Christ |

FOREIGN PATENT DOCUMENTS

| | | |
|---|---|---|
| DE | 10 2018 215 447 B3 | 10/2019 |
| EP | 1 662 196 A2 | 5/2006 |
| EP | 2 650 586 A1 | 10/2013 |
| FR | 2 874 247 A1 | 2/2006 |
| FR | 2 905 446 A1 | 3/2008 |
| GB | 2541734 A | 3/2017 |
| WO | WO 20/24608 A1 | 5/2000 |
| WO | WO 01/34235 A2 | 5/2001 |
| WO | WO 2015/078565 A1 | 6/2015 |
| WO | WO 2019/015885 A1 | 1/2019 |
| WO | WO 2019/192804 A1 | 10/2019 |
| WO | WO 2019/233677 A1 | 12/2019 |
| WO | WO 2021/018890 A1 | 2/2021 |

OTHER PUBLICATIONS

E/ECE/324/Rev.2/Add.133—E/ECE/TRANS/505/Rev.2/Add. 133, 2015, Agreement, Concerning the Adoption of Uniform Technical Prescriptions for Wheeled Vehicles, Equipment and Parts which can be Fitted and/or be Used on Wheeled Vehicles and the Conditions for Reciprocal Recognition of Approvals Granted on the Basis of these Prescriptions*, (total 127 pages with English translation).

* cited by examiner

[Fig. 2]
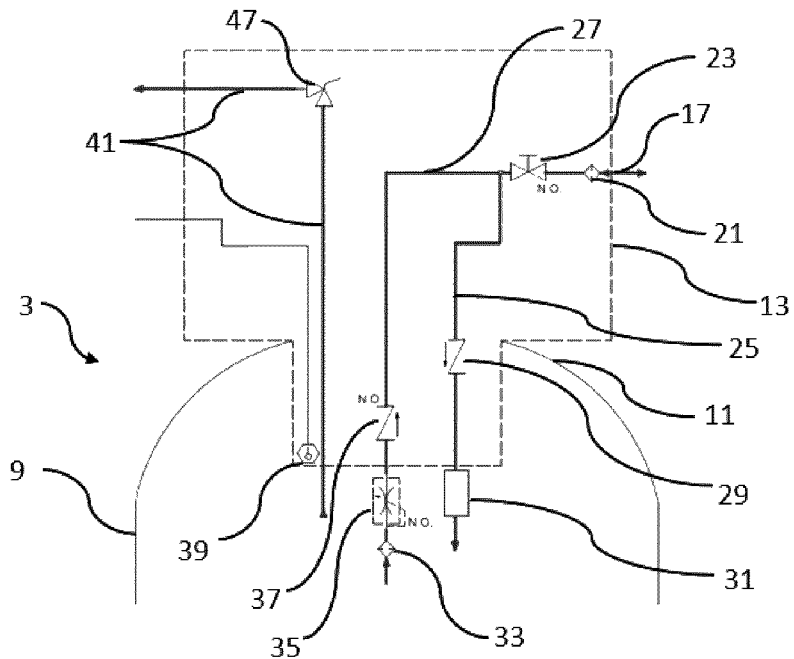
[Fig. 3]
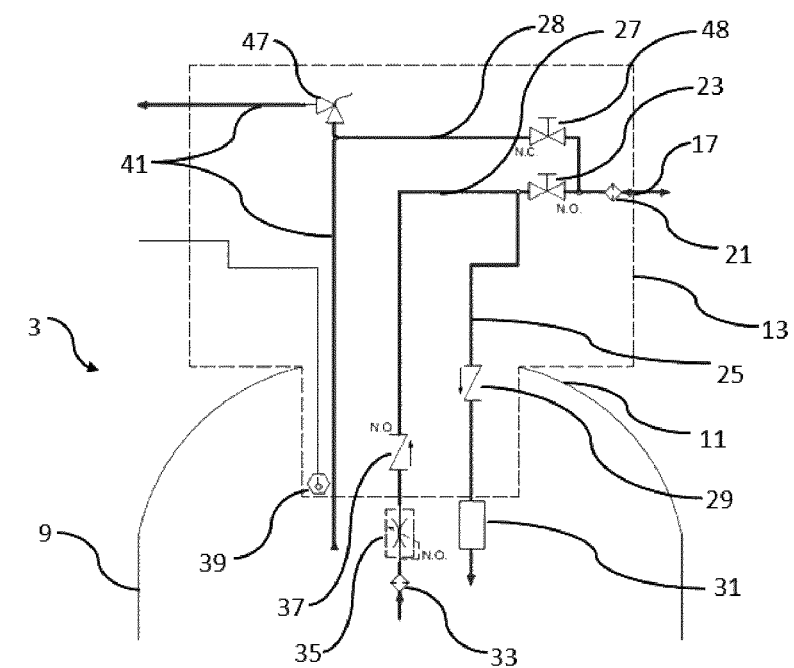

[Fig. 8]
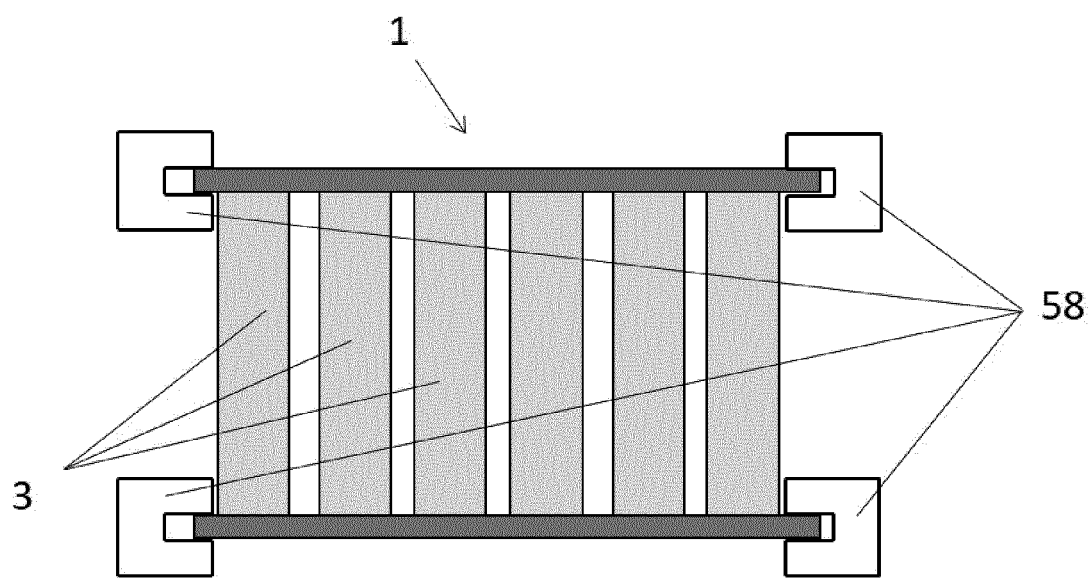

PRESSURIZED FLUID STORAGE AND DISPENSING ASSEMBLY FOR A VEHICLE

CROSS REFERENCE TO RELATED APPLICATIONS

The present application is a 371 national stage application of PCT/EP2020/084172, filed Dec. 1, 2020, and claims priority to French patent application FR1913611, filed Dec. 2, 2019, and French patent application FR2009993, filed Sep. 30, 2020.

The invention relates to the field of vehicles, such as motor vehicles, trucks, buses, trains or even boats. The invention relates more particularly to a pressurized fluid storage and dispensing assembly for a vehicle.

Already known in the state of the art is a pressurized fluid storage reservoir, which comprises an end piece and a functional member arranged on the end piece, which supports functional elements such as an electrically operated valve, in order for example to dispense the fluid from the reservoir to an energy conversion means on board the vehicle, such as a fuel cell, configured to supply energy to the propulsion means of the vehicle, such as an electric motor. Such a reservoir is conventionally composed of an internal envelope called a liner, which has a sealing function with respect to the fluid contained in the reservoir. The liner has an opening, which is surmounted by an end piece. The liner and the end piece are surrounded by a reinforcing structure, generally produced by rolling up strips of composite material based on thermosetting polymer, for example based on epoxy resin, filled with glass or carbon fibers. However, it is sometimes necessary to have several pressurized fluid storage reservoirs. Indeed, it is sometimes desired to increase the storage capacity on board the vehicle, whereas the available space is not compatible with the integration of a single high-capacity storage reservoir. It is then necessary to arrange several reduced-capacity reservoirs within this available space in order to increase the storage capacity on board the vehicle. In this case, the size resulting from the functional members does not allow optimization of the available space, and the weight of the storage and dispensing assembly thus produced is significant because the functional members of each reservoir represent a substantial weight.

The object of the invention is in particular to provide a storage and dispensing assembly whose spatial size is optimized and whose weight is reduced.

To this end, the subject of the invention is a pressurized fluid storage and dispensing assembly for a vehicle, preferably for a motor vehicle, comprising:

a plurality of pressurized fluid reservoirs, each reservoir comprising a first end piece provided with at least one fluid passage duct configured for dispensing fluid from the reservoir and for filling the reservoir, a use collector duct, which comprises an opening for supplying and/or dispensing fluid and a plurality of orifices, each orifice being configured to be fluidically connected to a reservoir via its fluid passage duct, and an electrically operated valve, which is arranged at one end of the use collector duct and selectively closes or opens the fluid passage through the opening for supplying and/or dispensing fluid.

Thus, a storage and dispensing assembly is provided that has an optimized spatial footprint and reduced weight. Indeed, due to the plurality of reservoirs, the space available for the storage and dispensing assembly can be filled to the maximum, without the weight of the storage and dispensing assembly being too great, because the assembly comprises a single electrically operated valve. It is thus not necessary to provide an electrically operated valve for each reservoir, which generates a considerable gain in weight and size, because an electrically operated valve is a particularly bulky element.

According to other optional features of the storage and dispensing assembly, taken alone or in combination:

the first end piece of each reservoir further comprises at least one functional element, which is arranged directly in the first end piece. This avoids having an additional functional member on the end piece, which additional member would generate additional bulk and weight.

the functional element(s) are chosen from among a pressure relief valve, preferably with thermal triggering, a valve forming a flow limiter, a non-return valve, a manual shut-off valve, an injector, a filter, a temperature sensor and a pressure sensor. Preferably, the first end piece of each reservoir comprises all these functional elements.

A flow limiter must be understood as a purely mechanical valve that closes automatically or that limits the output flow from the upstream of the passage duct in which it is arranged, when the pressure of the downstream fluid is lower by a predetermined value than the pressure of the upstream fluid. Here, the upstream is the passage duct leading to the reservoir, and the downstream is the fluid passage duct leading to the use collector duct.

the first end piece of each reservoir comprises means for closing the passage duct, which are solely mechanical and are arranged directly in the first end piece. Thus, each reservoir can be closed independently of the others, in particular when there is a need to test the tightness of a reservoir, for example in the event of a breakdown or repair. In addition, the storage and dispensing assembly can thus continue to be used, even in the event that a reservoir is defective. It is then sufficient to close the passage duct of this reservoir via the closing means.

the reservoirs extend longitudinally and are arranged parallel to each other such that the use collector duct extends substantially in one plane. Thus, the size is optimized, in particular when the available space is substantially prismatic.

the reservoirs are also aligned so that the use collector duct is substantially straight. Thus, the size is further optimized, especially when the available space is relatively flat.

the first end piece of each reservoir is provided with a first fluid discharge duct configured to discharge fluid to the atmosphere, the storage and dispensing assembly further comprising a first discharge collector duct, which comprises a first opening for discharging fluid to the atmosphere and a first plurality of orifices, each orifice being configured to be in fluid communication with a first end piece via its first fluid discharge duct. Thus, a single outlet to the atmosphere is necessary for the storage and dispensing assembly, which simplifies the general design of the vehicle.

in normal operation, the first discharge duct is closed by a first pressure relief valve. Thus, the entire contents of the reservoir are not rapidly discharged to the atmosphere as long as there is no overpressure of the fluid inside the reservoir, for example due to a fire.

the first pressure relief valve is arranged at least partly in the first discharge duct. Thus, in the event of rapid discharge of the fluid to the atmosphere, the discharge path is as short as possible.

the first pressure relief valve is arranged at least partly in the first discharge collector duct. Thus, the number of first safety valves can be less than the number of reservoirs.

each reservoir comprises a second end piece provided with a second fluid discharge duct configured to discharge fluid to the atmosphere, the storage and dispensing assembly further comprising a second discharge collector duct, which comprises a second opening for discharging fluid to the atmosphere and a second plurality of orifices, each orifice being configured to be in fluid communication with a second end piece via its second fluid discharge duct. Thus, a single outlet to the atmosphere is necessary for the storage and dispensing assembly, which simplifies the general design of the vehicle.

the second discharge duct is, in normal operation, closed by a second pressure relief valve. Thus, the entire contents of the reservoir are not rapidly discharged to the atmosphere as long as there is no overpressure of the fluid inside the reservoir, due to a fire for example.

the second pressure relief valve is arranged at least partly in the second discharge duct. Thus, in the event of rapid discharge of the fluid to the atmosphere, the discharge path is as short as possible.

the second pressure relief valve is arranged at least partly in the second discharge collector duct. Thus, the number of second safety valves can be less than the number of reservoirs.

the first end piece of each reservoir and the second end piece of each reservoir are provided with a fluid discharge duct configured to discharge fluid to the atmosphere, the storage and dispensing assembly further comprising a discharge collector duct, which comprises an opening for discharging fluid to the atmosphere and a plurality of orifices, each orifice being configured to be in fluid communication with a first or a second end piece via its fluid discharge duct. Thus, a single outlet to the atmosphere is necessary for the storage and dispensing assembly, which simplifies the general design of the vehicle.

the reservoirs are attached to a support structure whose main function is to secure the reservoirs together. Thus, the reservoirs are secured together by means of the support structure.

Advantageously, the support structure comprises a longitudinal metal part, for example a longitudinal part made of stainless steel from an extrusion die or a foundry mold.

the use collector duct is arranged in part of the support structure. Thus, another function of the support structure is to supply and/or dispense fluid.

the second discharge collector duct is arranged in a part of the support structure. Thus, another function of the support structure is to discharge the fluid to the atmosphere in the event of overpressure.

the support structure comprises fixing means configured to fix the storage and dispensing assembly to the vehicle. Thus, the attachment of the storage and dispensing assembly to the vehicle is simplified.

the reservoirs are supported only by the use collector duct and by the second discharge collector duct. Thus, the fixing of the storage and dispensing assembly is simplified, because it is not necessary to fix each reservoir to the vehicle.

the use collector duct and the second discharge collector duct are interconnected by means of at least one tie rod, preferably metallic. Thus, the storage and dispensing assembly is stiffened.

the reservoirs are screwed by the first end piece to the use collector duct and by the second end piece to the second discharge collector duct. Thus, the reservoirs are fixed in a simple manner to the use collector duct and to the second discharge collector duct.

the reservoirs are fixed by snap-fastening, preferably by quick connector, for example a bayonet-type connector, by the first end piece to the use collector duct and by the second end piece to the second discharge collector duct. Thus, the reservoirs are fixed in a simple manner to the use collector duct and to the second discharge collector duct.

the reservoirs are fixed via clamping means by the first end piece to the use collector duct and by the second end piece to the second discharge collector duct. The clamping means for example comprise a ring arranged on each of the first and second end pieces or on the use collector duct, and a loop arranged on the other element among the use collector duct and each of the first and second end pieces, the connection between the loop and the ring performing clamping between each of the first and second end pieces and the use collector duct. Thus, the reservoirs are fixed in a simple manner to the use collector duct and to the second discharge collector duct.

the reservoirs are identical. Thus, a modular design is possible, in which only the number of reservoirs is a variable for a given available space for a storage and dispensing assembly.

the reservoirs have an admissible storage pressure greater than 350 bar, preferably greater than 700 bar. Thus, a large quantity of fluid can be stored in the reservoirs, due to the high allowable pressure thereof.

the fluid is only in the gaseous state in the pressurized fluid reservoirs, and is preferably hydrogen. Thus, having a fluid only in the gaseous state avoids the sloshing phenomenon due to the accelerations experienced by the vehicle, when the fluid is in the at least partially liquid state in the reservoirs.

the storage and dispensing assembly is formed by assembling several storage and dispensing subassemblies. Thus, the storage and dispensing assembly is modular.

the storage and dispensing assembly is fitted with an impact protection. Thus, the storage and dispensing assembly is protected against deformation and breakage in the event of impact.

The invention also relates to a vehicle, preferably a motor vehicle, comprising:

a storage and dispensing assembly of the aforementioned type, an energy conversion means configured to supply energy to the propulsion means of the vehicle, which is fluidically connected to the opening of the use collector duct so that it can be supplied with fluid, a fluid filling means, which is fluidically connected to the opening of the use collector duct, and a means for controlling the electrically operated valve, which drives the electrically operated valve so that it closes the opening of the use collector duct by default, and opens the use collector duct during a filling phase and/or during a vehicle operating phase.

"Operating phase" must in particular be understood as a phase during which the energy conversion means is in operation, for example when starting the vehicle.

Above, the expression "by default" means in particular that the electrically operated valve closes the opening of the use collector duct when it is not electrically powered, which is for example the case when the vehicle is not running.

According to another optional feature of the vehicle according to the invention, the storage and dispensing assembly is housed in a housing of the vehicle configured to selectively removably house one of the storage and dispensing assembly and a battery pack. Thus, the vehicle can be powered, as desired, by gaseous hydrogen or batteries, without requiring any modification to the vehicle.

BRIEF DESCRIPTION OF THE FIGURES

The invention will be better understood upon reading the description which follows, given solely by way of example and with reference to the appended drawings in which:

FIG. 2 is a schematic sectional view of a detail of a storage and dispensing assembly, namely a reservoir with a first variant of the first end piece;

FIG. 3 is a schematic sectional view of a detail of a storage and dispensing assembly, namely a reservoir with a second variant of the first end piece;

FIG. 8 is a schematic view of a storage and dispensing assembly fitted with an impact protection.

DETAILED DESCRIPTION

Figure 1:
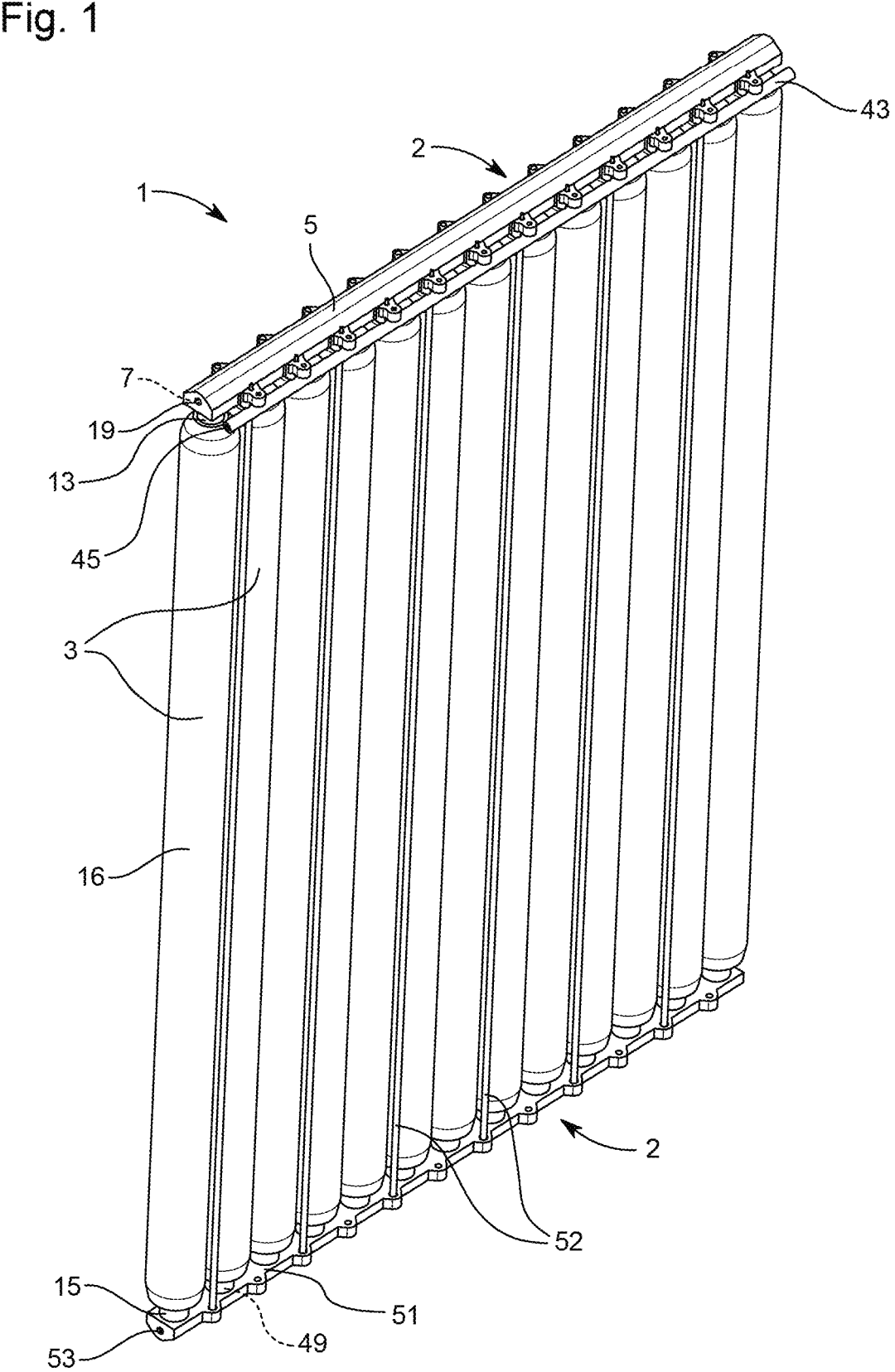
FIG. 1 is a schematic perspective view of a storage and dispensing assembly according to one embodiment of the invention.

FIG. 1 shows a storage and dispensing assembly 1 for pressurized fluid according to one embodiment of the invention. The fluid is for example gaseous hydrogen.

The storage and dispensing assembly 1 comprises a plurality of pressurized fluid reservoirs 3 secured together by a support structure 2, a use collector duct 5 and an electrically operated valve 7. In the example illustrated in FIG. 1, the reservoirs 3 are identical and the use collector duct 5 is arranged in part of the support structure 2.

As illustrated in the figures, each reservoir 3 is substantially cylindrical and is composed of an internal envelope, also called a liner 9. The liner 9 is for example made of polymer material, and comprises at least one opening in the form of a neck.

In the example illustrated in FIG. 1, the liner 9 comprises a first opening in the form of a neck 11 at one of its ends, the neck 11 being surmounted by a first end piece 13. The liner 9 also comprises a second opening in the form of a neck 12 at the other of its ends, the neck 12 being surmounted by a second end piece 15. The first end piece 13 and the second end piece 15 are for example metallic, preferably aluminum. The liner 9, the first end piece 13 and the second end piece 15 are surrounded by a reinforcing structure 16, for example produced by winding strips of composite material based on polymer filled with glass or carbon fibers.

In the example illustrated in FIG. 1, the reservoirs 3 extend longitudinally, are arranged parallel to each other and are also aligned. The reservoirs 3 have an admissible storage pressure greater than 350 bar, preferably greater than 700 bar.

In a first variant illustrated in FIG. 2, the first end piece 13 comprises a fluid passage duct 17 configured for dispensing fluid out of the reservoir 3 and/or for the filling of the reservoir 3. The passage duct 17 is thus fluidically connected to the use collector duct 5.

The use collector duct 5 comprises a plurality of orifices, each orifice being configured to be fluidically connected to a reservoir 3 via its fluid passage duct 17. The use collector duct 5 further comprises an opening 19 for supplying and/or dispensing fluid, which is arranged at one end of the use collector duct 5.

The use collector duct also bears the electrically operated valve 7, which is arranged at one end of the use collector duct 5 and selectively blocks or releases the passage of fluid through the opening 19.

The first end piece 13 further comprises functional elements arranged directly in the first end piece 13.

Thus, the passage duct 17 comprises a filter 21 and a manual shut-off valve 23, which is normally open, as indicated in FIGS. 2 and 3 in the "N.O." state.

The passage duct 17 further comprises a first branch 25 configured for filling the reservoir 3 with fluid, and a second branch 27 configured for dispensing fluid out of the reservoir 3.

The first branch 25 comprises a non-return valve 29 and an injector 31. The non-return valve 29 allows the passage of fluid from the manual shut-off valve 23 in the direction of the reservoir, and blocks the passage of fluid in the other direction. Thus, the first branch 25 allows filling of the reservoir 3.

The second branch 27 comprises a filter 33, a valve forming a flow limiter 35 and a non-return valve 37. The valve forming a flow limiter 35 is only mechanical and constitutes a means of automatic closing of the passage duct 17. The non-return valve 37 allows the passage of fluid from the reservoir toward the manual shut-off valve 23, and blocks the passage of fluid in the other direction. Thus, the second branch 27 allows dispensing of the fluid out of the reservoir 3.

The first end piece 13 also comprises a sensor 39. The sensor 39 is for example a temperature sensor and/or a pressure sensor.

The first end piece 13 further comprises a first fluid discharge duct 41 configured to discharge fluid to the atmosphere. The first discharge duct 41 is fluidically connected to a first discharge collector duct 43 of the storage and dispensing assembly 1. Thus, the first discharge collector duct 43 comprises a first opening 45 for discharging fluid to the atmosphere and a plurality of orifices, each orifice being configured to be fluidically connected with a first end piece 13 via its first fluid discharge duct 41. In normal operation, the first discharge duct 41 is closed by a first pressure relief valve 47, preferably thermally triggered via a fuse element 47f. In the event of an increase in temperature, for example due to a fire, the pressure increases within the reservoir 3. In order to avoid an explosion of the reservoir 3, the first relief valve 47 opens the first discharge duct 41 and allows a release of the fluid contained in the reservoir 3. This release is carried out at a predetermined rate, for example via a reduction in the section of the first discharge duct 41 or via a plug pierced with a hole placed in the first discharge duct 41. A pressure relief valve, also known as a Thermal and Pressure Relief Device (TPRD), is designed to rapidly release the entire contents of the reservoir. Such a device operates in the event of high temperature resulting for example from a fire to avoid weakening of the reservoir and rupture, which could have catastrophic consequences on equipment and personnel. The discharge flow rate of the gaseous hydrogen associated with the opening of a TPRD device is 70 g/s, which makes it possible to empty a reservoir of 200 liters of hydrogen at 350 bar in about ten minutes. In the event of a fire, only the reservoir whose temperature exceeds a certain threshold is emptied by opening the associated TPRD device. Neighboring reservoirs remain under pressure as long as their TPRD devices are not open.

In a second variant illustrated in FIG. 3, the first end piece 13 is similar to the first end piece 13 of the first variant illustrated in FIG. 2, but additionally comprises a branch duct in the form of a third branch 28 of the passage duct 17, which is configured to allow the emptying of the fluid from the reservoir 3. Thus, the third branch 28 connects the passage duct 17 from a point located between the filter 21 and the manual shut-off valve 23 to a point of the first discharge duct 41 located between the inside of the reservoir 3 and the first relief valve 47. The third branch 28 comprises a manual shut-off valve 48, which is normally closed, as shown in FIG. 3 in the "N.C." state. Thus, if necessary, for example after the reservoir 3 has been disassembled, the manual shut-off valve 48 can be opened to allow the reservoir 3 to be emptied.

Figure 4:
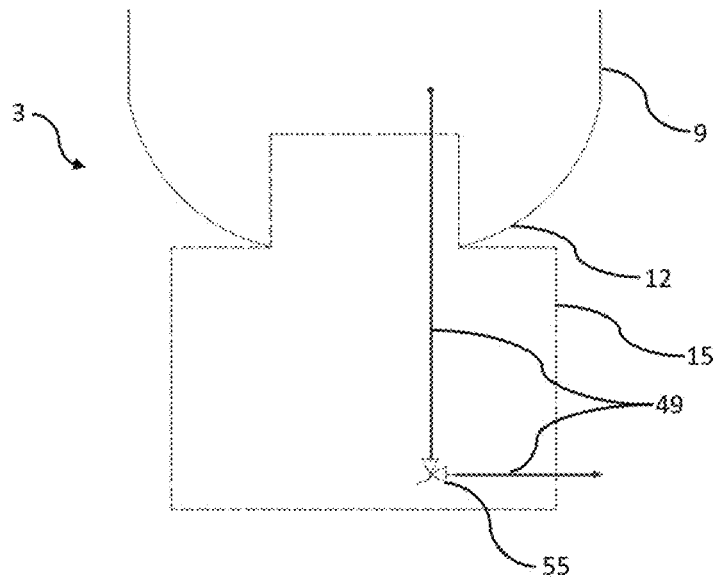
FIG. 4 is a schematic sectional view of a detail of a storage and dispensing assembly, namely a reservoir with a second end piece.

As illustrated in FIG. 4, the second end piece 15 comprises a second fluid discharge duct 49 configured to discharge fluid to the atmosphere. The second discharge duct 49 is thus fluidically connected to a second discharge collector duct 51 of the storage and dispensing assembly 1. In the example illustrated, particularly visible in FIG. 6, the second discharge collector duct 51 is arranged in a part of the support structure 2. The second discharge collector duct 51 comprises a second opening 53 for discharging fluid to the atmosphere and a plurality of orifices, each orifice being configured to be fluidically connected with a second end piece 15 via its second fluid discharge duct 49. The second discharge duct 49 is, in normal operation, closed by a second pressure relief valve 55, preferably thermally triggered via a fuse element 55*f*. In the event of an increase in temperature, for example due to a fire, the pressure increases within the reservoir 3. In order to avoid an explosion of the reservoir 3, the second relief valve 55 opens the second discharge duct 49 and allows the fluid contained in the reservoir 3 to be released. This release is carried out at a predetermined rate, for example via a reduction in the section of the second discharge duct 49 or via a plug pierced with a hole placed in the second discharge duct 49.

In the example illustrated in FIG. 1, the reservoirs 3 are supported only by the use collector duct 5 and by the second discharge collector duct 51. The use collector duct 5 and the second discharge collector duct 51 are arranged in parallel and are connected by tie rods 52 in the form of metal rods, in order to stiffen the storage and dispensing assembly 1.

The reservoirs 3 are for example screwed, snapped or fixed by clamping, by their first end piece 13 to the use collector duct 5 and by their second end piece 15 to the second discharge collector duct 51. Preferably, the threads of the first end piece 13 and of the second end piece 15 are reversed so that, by rotation of a reservoir 3 about its longitudinal axis, the latter is screwed both into the use collector duct 5 and into the second discharge collector duct 51. The use collector duct 5, the first discharge collector duct 43 and the second discharge collector duct 51 are for example made of metal, preferably aluminum.

Figure 5:
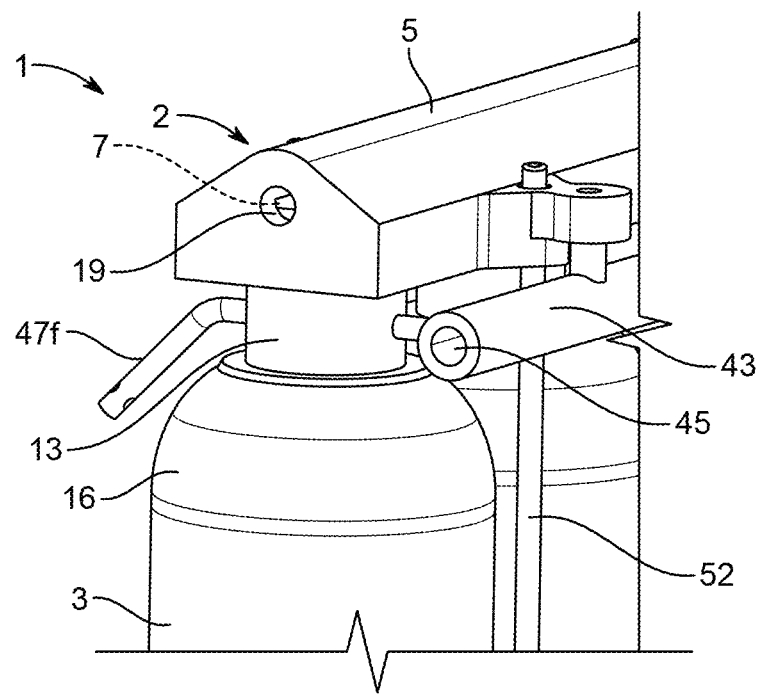
FIG. 5 is a schematic perspective view of a detail of a storage and dispensing assembly shown in FIG. 1.
Figure 6:
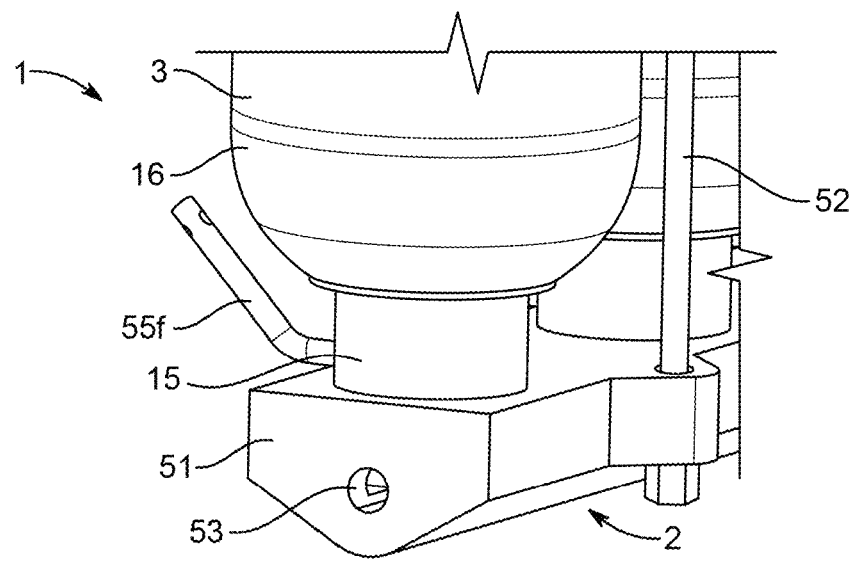
FIG. 6 is a schematic perspective view of a detail of a storage and dispensing assembly shown in FIG. 1.
Figure 7:
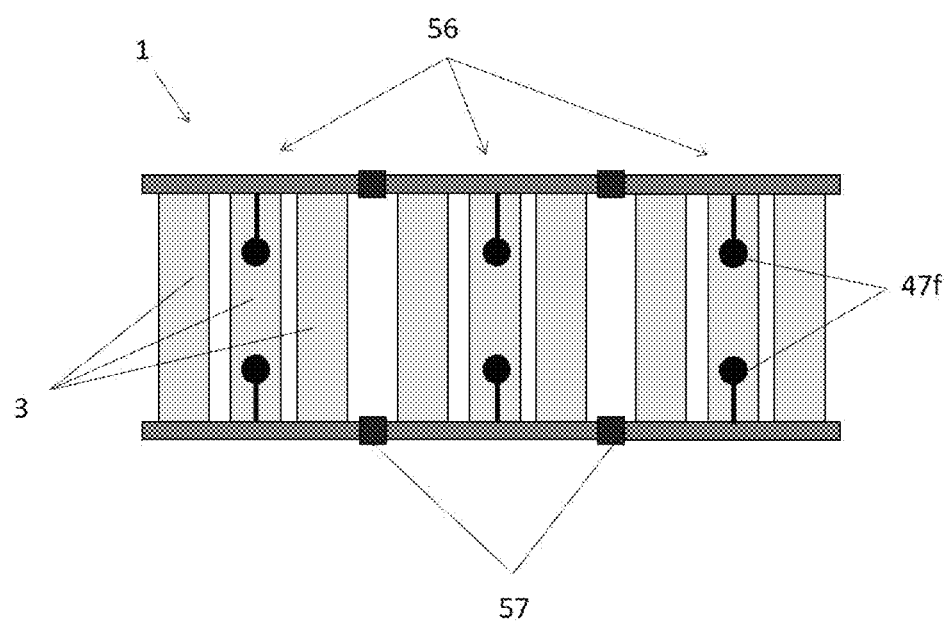
FIG. 7 is a schematic view of a storage and dispensing assembly comprising several storage and dispensing subassemblies.

FIGS. 5 and 6 show details of a storage and dispensing assembly illustrated in FIG. 1. FIG. 7 shows a storage and dispensing assembly 1 formed by assembling several storage and dispensing subassemblies 56, each subassembly 56 comprising a fraction of the plurality of reservoirs 3. For example, in the case of a storage and dispensing assembly comprising nine reservoirs 3, these can be divided into three sub-assemblies 56 each comprising three reservoirs 3. In another example (not shown), the storage and dispensing assembly comprises twelve reservoirs 3, which are divided into three sub-assemblies 56 each comprising four reservoirs 3. This arrangement allows the storage and dispensing assembly to be made modular, that is to say, capable of adapting to different storage needs from one motor vehicle to another.

The sub-assemblies 56 are mechanically linked together by mechanical fasteners 57. Advantageously, there is a first relief valve 47 per sub-assembly 56, the first relief valve 47 being arranged in the first discharge collector duct 43 of the sub-assembly 56. Thus, the number of first relief valves 47 is minimized, which makes it possible to reduce the cost and the mass of the storage and dispensing assembly 1.

Advantageously, one or two fuse elements 47*f* are arranged per sub-assembly 56 rather than per reservoir 3, which allows the number of fuse elements to be minimized and thus allows the cost and the mass of the storage and dispensing assembly 1 to be reduced.

A storage and dispensing assembly 1 as mentioned above is for example placed on a vehicle (not shown), preferably a motor vehicle, which thus comprises the storage and dispensing assembly 1, and an energy conversion means configured to supply energy to the propulsion means of the vehicle, which is fluidically connected to the opening of the use collector duct 5 so that it can be supplied with fluid, a fluid filling means, which is fluidically connected to the opening of the use collector duct 5, and a means for controlling the electrically operated valve 7, which drives the electrically operated valve 7 so that it closes the opening of the use collector duct 5 by default, and opens the use collector duct 5 during a filling phase and/or during a motor vehicle operating phase.

In a particular embodiment of the vehicle (not shown), the storage and dispensing assembly 1 is housed in a housing of the vehicle configured to selectively removably house one of the storage and dispensing assembly 1 and a battery pack. This allows the vehicle to store both hydrogen gas and batteries, without the need to modify the vehicle. Owing to this arrangement, the same vehicle can be powered, as desired, by gaseous hydrogen or batteries.

"Battery pack" must be understood as a set composed of several battery modules that are in turn composed of several cells, as well as safety components, electrical interconnections, thermal management and battery management systems (BMS), the assembly being contained in a rigid case.

FIG. 8 shows a storage and dispensing assembly 1 fitted with an impact protection. Indeed, in case of impact, for example during an accident of the vehicle equipped with the storage and dispensing assembly 1, due to the large mass of the storage and dispensing assembly 1, the internal mechanical connections to the use collector duct 5, to the second discharge collector duct 51 and to the functional elements of the first 13 and second 15 end pieces are at risk of deforming or breaking. To avoid this, provision is made to protect the use collector duct 5 and the second discharge collector duct 51 with means that reduce and absorb the effect of the impact, for example, an impact protection 58. The impact protection 58 is, for example, four rubber blocks arranged at the four corners of the storage and dispensing assembly 1; a block at each end of a collector duct 5, 51.

The invention is not limited to the embodiments described here, and other embodiments will become clearly apparent to a person skilled in the art. It is in particular possible to make the first discharge duct 41 in the form of a hole passing through the first end piece 13, so as to allow easy cleaning of the inside of the reservoir at the end of manufacture, then to arrange, in the first discharge duct 41, a plug pierced with a passage hole for the fluid and the first relief valve 47. It is in particular possible to make the second discharge duct 49 in the form of a hole passing through the second end piece 15, so as to allow easy cleaning of the interior of each reservoir at the end of manufacture and to quickly and easily carry out a pressure resistance test of each reservoir by filling the reservoir with fluid to a test pressure greater than the allowable storage pressure for the reservoir, the test pressure preferably being equal to 1.5 times the allowable storage pressure, then placing, in the second discharge duct 49, a plug pierced with a passage hole for the fluid and the second relief valve 55. The invention is not limited to hydrogen gas. Indeed, the invention also applies to other gases stored under pressure such as, for example, natural gas.

LIST OF REFERENCES

1: storage and dispensing assembly
2: support structure
3: reservoir
5: use collector duct
7: electrically operated valve
9: liner
11, 12: neck
13: first end piece
15: second end piece
16: reinforcing structure
17: passage duct
19: opening
21: filter
23: manual shut-off valve
25: first branch
27: second branch
28: third branch
29: non-return valve
31: injector
33: filter
35: flow limiter valve
37: non-return valve
39: sensor
41: first discharge duct
43: first discharge collector duct
45: first discharge opening
47: first relief valve
47*f*: fuse element
48: manual shut-off valve
49: second discharge duct
51: second discharge collector duct
52: tie rod
53: second discharge opening
55: second relief valve
55*f*: fuse element
56: storage and dispensing subassembly
57: mechanical fastener
58: impact protection

The invention claimed is:

1. A pressurized fluid storage and dispensing assembly for a vehicle, wherein the pressurized fluid storage and dispensing assembly comprises:
    a plurality of pressurized fluid reservoirs, each reservoir comprising (i) a first end piece provided with at least one fluid passage duct configured for dispensing fluid from the reservoir and for filling the reservoir and (ii) a second end piece provided with a second fluid discharge duct configured to discharge fluid to the atmosphere,
    a use collector duct, which comprises an opening for supplying and/or dispensing fluid and a plurality of orifices, each orifice being configured to be fluidically connected to one reservoir of said plurality of pressurized fluid reservoirs via the fluid passage duct of said one reservoir of said plurality of pressurized fluid reservoirs,
    an electrically operated valve, which is arranged at one end of the use collector duct and selectively closes or opens the opening, and
    a second discharge collector duct, which comprises a second opening for discharging fluid to the atmosphere and a second plurality of orifices, each orifice being configured to be in fluid communication with the second end piece of one reservoir of said plurality of pressurized fluid reservoirs via its second fluid discharge duct.

2. The pressurized fluid storage and dispensing assembly according to claim 1, wherein the first end piece of each reservoir further comprises at least one functional element, which is arranged directly in the first end piece.

3. The pressurized fluid storage and dispensing assembly according to claim 2, wherein the at least one functional element is selected from the group consisting of:
    a pressure relief valve, or a pressure relief valve with thermal release;
    a flow limiter valve;
    a non-return valve;
    a manual shut-off valve;
    an injector;
    a filter;
    a temperature sensor; and
    a pressure sensor.

4. The pressurized fluid storage and dispensing assembly according to claim 1, wherein the first end piece of each reservoir comprises a valve mechanism for closing the one passage duct of the at least one fluid passage duct, the valve mechanism being arranged directly in the first end piece.

5. The pressurized fluid storage and dispensing assembly according to claim 1, wherein the reservoirs extend longitudinally and are arranged parallel to each other such that the use collector duct extends substantially in one plane.

6. The pressurized fluid storage and dispensing assembly according to claim 5, wherein the reservoirs are further aligned so that the use collector duct is substantially straight.

7. The pressurized fluid storage and dispensing assembly according to claim 1, wherein the first end piece of each reservoir is provided with a first fluid discharge duct configured to discharge fluid to the atmosphere, the storage and dispensing assembly further comprising:
    a first discharge collector duct, which comprises a first opening for discharging fluid to the atmosphere and a first plurality of orifices, each orifice being configured to be in fluid communication with the first end piece of one reservoir of said plurality of pressurized fluid reservoirs via its first fluid discharge duct.

8. The pressurized fluid storage and dispensing assembly according to claim 1, wherein the second fluid discharge duct is, in normal operation, closed by a second pressure relief valve.

9. The pressurized fluid storage and dispensing assembly according to claim 1, wherein the reservoirs are attached to a support structure whose main function is to secure the reservoirs together, and wherein the use collector duct is arranged in part of the support structure.

10. The pressurized fluid storage and dispensing assembly according to claim 1, wherein the reservoirs are supported only by the use collector duct and by the second discharge collector duct.

11. The pressurized fluid storage and dispensing assembly according to claim 1, wherein the fluid is only in the gaseous state in the pressurized fluid reservoirs.

12. The pressurized fluid storage and dispensing assembly according to claim 11, wherein the fluid in the gaseous state in the pressurized fluid reservoirs is hydrogen.

13. The pressurized fluid storage and dispensing assembly according to claim 1, wherein the pressurized fluid storage and dispensing assembly is formed by assembling several storage and dispensing subassemblies.

14. The pressurized fluid storage and dispensing assembly according to claim 1, wherein the storage and dispensing assembly is fitted with an impact protection.

15. A vehicle, comprising a pressurized fluid storage and dispensing assembly according to claim 1.

16. The vehicle according to claim 15, wherein the vehicle is a motor vehicle.

* * * * *